Figure 1:
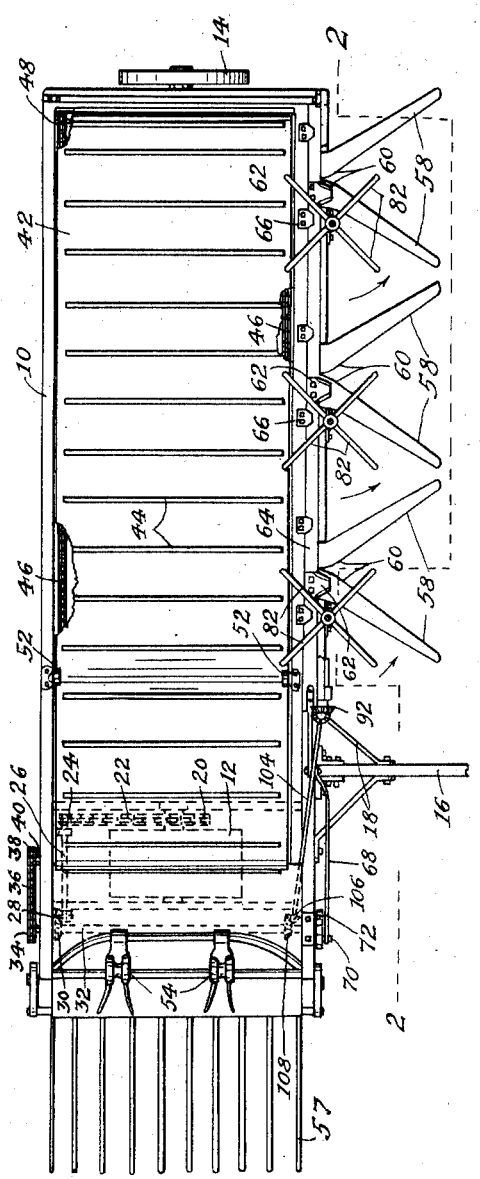

P. A. PUTNAM.
HARVESTER.
APPLICATION FILED AUG. 9, 1918.

1,390,813. Patented Sept. 13, 1921.

Inventor:
Parker A. Putnam.
By Whiteley and Ruckman
his Attorneys.

UNITED STATES PATENT OFFICE.

PARKER A. PUTNAM, OF TINTAH, MINNESOTA.

HARVESTER.

1,390,813.

Specification of Letters Patent. Patented Sept. 13, 1921.

Application filed August 9, 1918. Serial No. 249,179.

*To all whom it may concern:*

Be it known that I, PARKER A. PUTNAM, a citizen of the United States, residing at Tintah, in the county of Traverse and State of Minnesota, have invented certain new and useful Improvements in Harvesters, of which the following is a specification.

My invention relates to harvesters and particulary to harvesters for crops which are grown in rows which are separated from each other by considerable space, such as corn. An object of my invention is to provide a machine whereby a plurality of rows may be simultaneously cut and conveyed to a binding device which forms the stalks into bundles so that no manual handling is required up to the time the bundles are deposited upon the ground. Another object is to provide means for effectively gathering and guiding the stalks into cutting position even when the stalks are bent over toward the ground.

The full objects and advantages of my invention will appear in connection with the detailed description thereof and are particularly pointed out in the claims.

Figure 2:
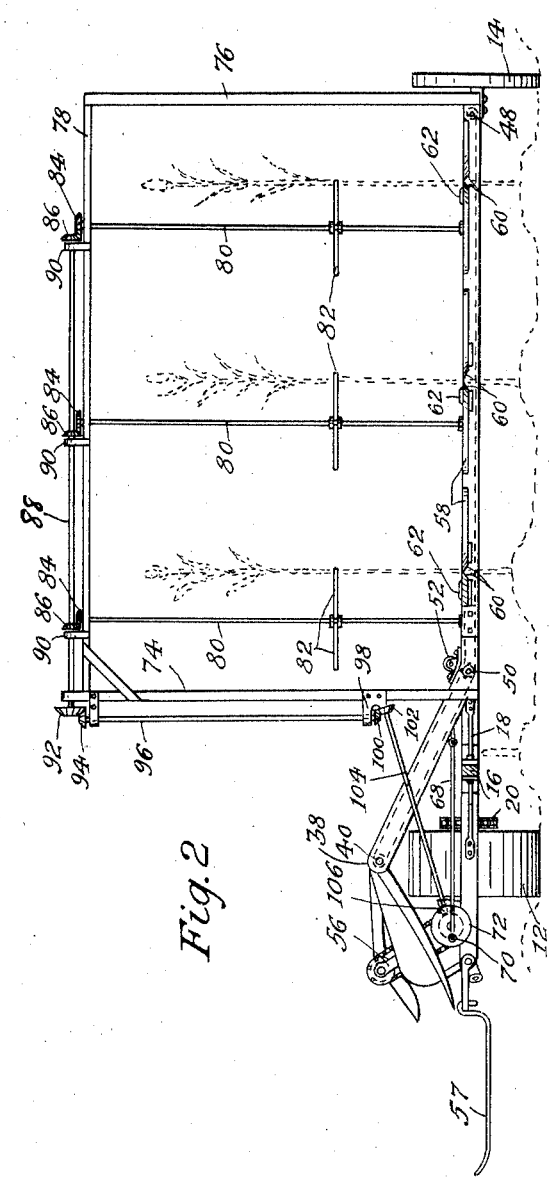

Referring to the drawings which illustrate my invention in one form,

Figure 1 is a top plan view with certain parts broken away. Fig. 2 is a vertical section on line 2—2 of Fig. 1.

Referring to the drawings the frame 10 of the harvester is supported upon a drive wheel 12 and a grain wheel 14. The tongue 16 is secured to the frame and is braced by rods 18 in the usual manner. Secured to the shaft of the drive wheel is a sprocket 20 connected by rearwardly extending sprocket chain 22 to a sprocket 24 secured to one end of a shaft 26. On the other end of this shaft is secured a beveled gear 28 in mesh with a beveled gear 30 secured to a forwardly extending shaft 32. The rear end of said shaft extends out beyond the frame and has secured to it a sprocket 34 over which passes a sprocket chain 36, the latter also passing over a sprocket 38 secured to a shaft 40. The shaft 40 serves to drive a conveyer belt 42. This belt is made of fabric such as canvas and is provided on its outer surface with slats 44 in the usual manner. To the inner surface of the belt near the margin thereof are secured chains 46. These chains pass over sprockets 48 near the grain wheel and sprockets 50 near the drive wheel, the belt extending horizontally between these sprockets. From the sprockets 50 the belt inclines upwardly to the shaft 40 and the chains pass over sprockets on said shaft by means of which the belt is driven. The upper stretch of the belt passes underneath rollers 52 located at the position where the belt starts to travel upwardly and the belt at its uppermost position discharges into duplicate binding devices 54 which bind the stalks together at two places to form a bundle. Each of the binding devices is of the customary construction and they are driven in the usual manner by a sprocket chain 56 from the shaft 32. The bundles are ejected upon a bundle carrier 57 of usual construction. To the front of the frame are secured a plurality of pairs of guides 58. Each pair of guides consists of two fingers slightly separated from each other at the point where they are secured to the frame. The edges of the fingers facing each other are sharpened where they approach each other at 60 and they then diverge from each other so that the forward ends of the intermediate fingers of the pairs of guides are located close to each other. By extending the guides forwardly in this manner the stalks of the different rows will be guided into proper position for cutting and will be picked up if they are lying down. Arranged for coöperation with the sharpened edges 60 are cutting blades 62 secured to a cutter bar 64 held to reciprocate beneath guide plates 66. The cutter bar is reciprocated by means of a pitman rod 68 attached to a wrist pin 70 on a disk 72 which is secured to the forward end of the shaft 32. To the main frame is secured an auxiliary frame consisting of uprights 74 and 76 connected by the horizontal bar 78. Shafts 80 are journaled near their upper ends in bar 78 and at their lower ends are journaled in the main frame a short distance to the side of the guides 58. Secured to the shafts 80 are arms 82 adapted to be rotated in proper direction to carry the stalks into position to be cut and then tip them back upon the conveyer belt. Secured to the upper ends of the shafts 80 are beveled gears 84 in mesh with beveled gears 86 secured to a shaft 88 mounted in journals 90 which are attached to the bar 78. Secured to the inner end of the shaft 88 is a beveled gear 92 meshing with a beveled gear 94 secured to a shaft 96 mounted in journals 98 attached to the upright 74. Secured to the lower end of the shaft 96 is a beveled gear 100 meshing with a beveled gear 102 secured to one end of a shaft 104, the other end of which has secured to it a beveled gear 106 in mesh with a beveled gear 108 secured to the shaft 32.

The operation and advantages of my invention will be apparent from the foregoing description. The stalks which are to be cut and bound are guided by the fingers or guides 58 between the cutting edges 60 where they are cut by the reciprocating blades 62 which coöperate with the cutting edges 60 with a shearing action, it being understood that the range of movement of the blades 62 is such that the opposite sides thereof coöperate alternately with the cutting edges 60. The rotating arms 82 assist in guiding the stalks into proper position and then force the stalks backwardly into a recumbent position upon the traveling belt 42 which conveys them to the duplicate binding devices 54 which form a bundle securely held together on account of being bound at two separate places. Should one of the binding devices fail to tie, the other one will still cause the bundle to be held together although not as securely as though both functioned properly.

I claim:

1. A harvester comprising a plurality of pairs of guide fingers in which the fingers of each pair diverge from each other as they extend forwardly, the forward ends of the intermediate fingers of said pairs being positioned close to each other, each of the pairs of said fingers being provided with cutting edges facing each other on their rearward portions, means coöperating with said cutting edges for cutting stalks, arms positioned to rotate over said cutting edges in a horizontal plane, means for rotating said arms in a direction to tip rearwardly the stalks which are being cut, a conveyer belt upon which such stalks are deposited, and a binding device to which said stalks are delivered by said conveyer belt.

2. A harvester comprising a plurality of pairs of guide fingers in which the fingers of each pair diverge from each other as they extend forwardly, the forward ends of the intermediate fingers of said pairs being positioned close to each other, each of the pairs of said fingers being provided with cutting edges facing each other on their rearward portions, reciprocating cutting blades coöperating with said cutting edges for cutting stalks, arms positioned to rotate over said cutting edges in a horizontal plane, means for rotating said arms in a direction to tip rearwardly the stalks which are being cut, a conveyer belt upon which such stalks are deposited, and a duplicate binding device to which such stalks are delivered by said conveyer belt whereby the stalks are bound into bundles at two separate places.

In testimony whereof I hereunto affix my signature.

PARKER A. PUTNAM.